United States Patent
Eckel et al.

(10) Patent No.: US 6,569,930 B1
(45) Date of Patent: May 27, 2003

(54) FLAME AND STRESS CRACK RESISTANT POLYCARBONATE MOLDING COMPOSITIONS

(75) Inventors: Thomas Eckel, Dormagen (DE); Dieter Wittmann, Leverkusen (DE); Michael Zobel, Düsseldorf (DE); Bernd Keller, Geldern (DE); Heinrich Alberts, Odenthal (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/485,165

(22) PCT Filed: Jul. 29, 1998

(86) PCT No.: PCT/EP98/04734

§ 371 (c)(1),
(2), (4) Date: Feb. 4, 2000

(87) PCT Pub. No.: WO99/07782

PCT Pub. Date: Feb. 18, 1999

(30) Foreign Application Priority Data

Aug. 11, 1997 (DE) .......................... 197 34 661

(51) Int. Cl.⁷ .......................... C08K 5/521; C08K 3/22
(52) U.S. Cl. .................. 524/127; 524/141; 524/145; 524/430; 524/437
(58) Field of Search ................ 524/127, 141, 524/145, 451, 437, 404, 406, 408, 413, 423, 424, 428, 430, 432, 434, 492, 493

(56) References Cited

U.S. PATENT DOCUMENTS

| 4,914,144 | A | * | 4/1990 | Muehlbach et al. | |
| 5,030,675 | A | | 7/1991 | Wittmann et al. | 524/130 |
| 5,061,745 | A | | 10/1991 | Wittmann et al. | 524/139 |
| 5,204,394 | A | | 4/1993 | Gosens et al. | 363/125 |
| 5,455,292 | A | * | 10/1995 | Kakegawa et al. | |
| 5,723,526 | A | * | 3/1998 | Nagasawa | 524/451 |
| 5,750,602 | A | * | 5/1998 | Kohler et al. | |
| 5,849,827 | A | * | 12/1998 | Bodiger et al. | 524/423 |
| RE36,188 | E | | 4/1999 | Gosens et al. | 363/125 |
| 5,900,446 | A | * | 5/1999 | Nishihara et al. | |
| 5,961,915 | A | * | 10/1999 | Toyouchi et al. | |
| 6,008,293 | A | * | 12/1999 | Nakano et al. | |
| 6,127,465 | A | * | 10/2000 | Nodera | 525/127 |

FOREIGN PATENT DOCUMENTS

| EP | 363 608 | * | 4/1990 |
| EP | 0 767 204 | | 4/1997 |
| JP | 59-202240 | | 11/1984 |
| WO | 96/27600 | | 9/1996 |

* cited by examiner

*Primary Examiner*—Peter Szekely
(74) *Attorney, Agent, or Firm*—Joseph C. Gil; Aron Preis; James R. Franks

(57) ABSTRACT

A flame resistant thermoplastic molding composition is disclosed. The composition contains aromatic polycarbonate, graft polymer, a specifically structured phosphorous compound, fluorinated polyolefin and inorganic compound with an average particle size no greater that 200 nm and an optional vinyl(co)polymer. The inventive composition is characterized in its improved stress cracking resistance and mechanical properties.

15 Claims, No Drawings

FLAME AND STRESS CRACK RESISTANT POLYCARBONATE MOLDING COMPOSITIONS

CROSS REFERENCE TO RELATED PATENT APPLICATIONS

The present patent application claims the right of priority under 35 U.S.C. 119 and 35 U.S.C. 365 of International Application No. PCT/EP98/04734, filed Jul. 29, 1998, which was published in German as International Patent Publication No. WO 99/07782 on Feb. 18, 1999, which is entitled to the right of priority of German Patent Application No. 197 34 661.8, filed Aug. 11, 1997.

FIELD OF THE INVENTION

The present invention relates to flame-proof polycarbonate ABS moulding compositions containing phosphate compounds and inorganic materials which have excellent resistance to stress cracking.

BACKGROUND OF THE INVENTION

EP-A 0 174 493 (U.S. Pat. No. 4,983,658) describes flame-proofed, halogen-containing polymer mixtures consisting of aromatic polycarbonate, styrene-containing graft copolymer, monophosphates and a specific polytetrafluoroethylene formulation. Although these mixtures are adequate in terms of fire behaviour and level of mechanical values, shortcomings may arise as regards resistance to stress cracking.

U.S. Pat. No. 5,030,675 describes flame-proof thermoplastic moulding compositions consisting of aromatic polycarbonate, ABS polymer, polyalkylene terephthalate as well as monophosphates and fluorinated polyolefins as flame-proofing additives. Good resistance to stress cracking is contrasted by disadvantages in the form of shortcomings as regards notch impact strength and inadequate thermostability under high thermal load such as the processing process.

Diphosphates are known as flame-proofing additives. JA 59 202 240 describes the production of such a product from phosphorus oxychloride, diphenols such as hydroquinone or bisphenol A and monophenols such as phenol or cresol. These diphosphates may be used in polyamide or polycarbonate as flame-proofing agents. In this literature, however, there is no indication of improved resistance to stress cracking by addition of the oligomeric phosphate to polycarbonate moulding compositions.

EP-A 0 363 608 (=U.S. Pat. No. 5,204,394) describes polymer mixtures consisting of aromatic polycarbonate, styrene-containing copolymer or graft copolymer and oligomeric phosphates as flame-proofing additives. U.S. Pat. No. 5,061,745 describes polymer mixtures consisting of aromatic polycarbonate, ABS graft polymer and/or styrene-containing copolymer and monophosphates as flame-proofing additives. The level of the stress cracking resistance of these mixtures is often inadequate for the production of thin-walled housing parts.

EP-A 0 767 204 describes flame-proof polyphenylene oxide (PPO) and/or polycarbonate mixtures which contain a mixture consisting of oligophosphates (bisphenol A (BPA)-oligophosphate type) and monophosphates as flame-proofing agents. High flame-proofing agent contents lead to disadvantageous mechanical properties and reduced heat deflection temperature.

EP-A 0 611 798 and WO 96/27600 describe moulding compositions which contain oligomeric, terminally alkylated phosphoric acid esters of the BPA type in addition to polycarbonate. Because of the alkylation, high contents are required in order to achieve effective flame-proofing, and this is very disadvantageous for many technical application properties.

EP-A 0 754 531 describes reinforced PC/ABS moulding compositions which are suitable for precision components. Inter alia, oligophosphates of the BPA type are used as flame-proofing agents. The high filler contents have a very disadvantageous effect on the mechanical properties.

SUMMARY OF THE INVENTION

Surprisingly it has now been found that flame-proof polycarbonate ABS moulding compositions have excellent stress cracking resistance and notch impact strength as well as a high heat deflection temperature when they contain an additive combination consisting of a specific phosphorus compound and a synergistically acting quantity of one or more inorganic materials. A particularly favourable property combination is achieved when the phosphorus compound is made up of bisphenol A units. These moulding compositions are particularly suitable for producing thin-walled housing parts (data processing housing parts) where high processing temperatures and pressures lead to considerable stress on the material used.

The invention provides flame-proof thermoplastic moulding compositions containing A. 40 to 98 parts by weight, preferably 50 to 95 parts by weight, particularly preferably 60 to 90 parts by weight of an aromatic polycarbonate, B. 0 to 50, preferably 1 to 30 parts by weight, of a vinyl (co)polymer consisting of at least one monomer selected from the series styrene, α-methylstyrene, ring-substituted styrenes, $C_1$–$C_8$-alkyl methacrylates, $C_1$–$C_8$-alkyl acrylates with at least one monomer from the series acrylonitrile, methacrylonitrile, $C_1$–$C_8$-alkyl methacrylates, $C_1$–$C_8$-alkyl acrylates, maleic anhydride, N-substituted maleinimides, C. 0.5 to 60 parts by weight, preferably 1 to 40 parts by weight, particularly preferably 2 to 30 parts by weight of a graft polymer, D. 0.5 to 20 parts by weight, preferably 1 to 18 parts by weight, particularly preferably 2 to 15 parts by weight of a phosphorus compound of formula (I)

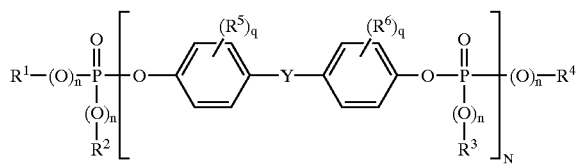

in which $R^1$, $R^2$, $R^3$ and $R^4$ independently of each other mean $C_1$–$C_8$ alkyl optionally substituted by halogen, $C_5$–$C_6$-cycloalkyl, $C_6$–$C_{10}$-aryl or $C_7$–$C_{12}$-aralkyl optionally substituted by halogen and/or alkyl in each case, n independently of each other means 0 or 1, q independently of each other means 0, 1, 2, 3 or 4, N means 0.1 to 5 and $R^5$ and $R^6$ independently of each other mean $C_1$–$C_4$-alkyl, preferably methyl or halogen, preferably chlorine and/or bromine, Y means $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, —$SO_2$— or —CO—, E 0.05 to 5 parts by weight, preferably 0.1 to 1 part by weight, particularly preferably 0.1 to 0.5 parts by weight of a fluorinated polyolefin, F. 0.01 to 50 parts by weight, preferably 0.1 to 20 parts by weight, particularly preferably 0.5 to 10 parts by weight of finely divided inorganic powder with an average particle diameter ≦200 nm.

The sum of all parts by weight A+B+C+D+E+F is 100.

DETAILED DESCRIPTION OF THE INVENTION

Component A

Thermoplastic aromatic polycarbonates suitable according to the invention according to Component A are those based on diphenols of formula (II)

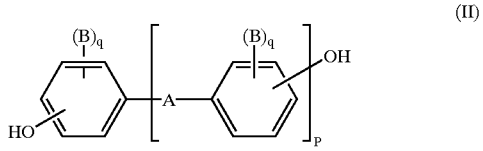

(II)

in which

A is a single bond $C_1$–$C_5$-alkylene, $C_2$–$C_5$-alkylidene, $C_5$–$C_6$-cycloalkylidene, —S— or —$SO_2$—, B is chlorine, bromine, q is 0,1 or 2 and p is 1 or 0, or alkyl-substituted dihydroxyphenyl cycloalkanes of formula (III)

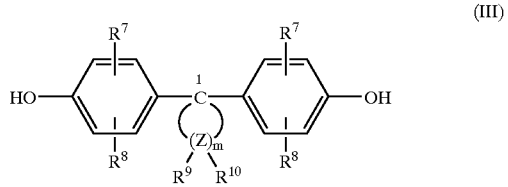

(III)

in which $R^7$ and $R^8$ independently of each other, in each case mean hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, particularly benzyl, m means a whole number of 4, 5, 6 or 7, preferably 4 or 5, $R^9$ and $R^{10}$, individually selectable for each Z and independently of each other mean hydrogen or $C_1$–$C_6$-alkyl, and Z means carbon, with the proviso that on at least one atom Z $R^9$ and $R^{10}$ simultaneously mean alkyl.

Examples of suitable diphenols of formula (H) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols of formula (II) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols of formula (III) are 1,1-bis-(4-hydroxyphenyl)-3,3-dimethyl-cyclohexane, 1,1-bis-(4-hydroxyphenyl)-3,3,5-trimethyl cyclohexane and 1,1-bis-(4-hydroxyphenyl)-2,4,4-trimethyl-cyclopentane.

Polycarbonates suitable according to the invention are both homopolycarbonates and copolycarbonates.

Component A may also be a mixture of the thermoplastic polycarbonates defined above.

Polycarbonates may be produced in known manner from diphenols with phosgene by the interface process or with phosgene by the process in homogeneous phase, the so-called pyridine process, wherein the molecular weight can be set in known manner by means of a corresponding quantity of known chain terminators.

Examples of suitable chain terminators are phenol, p-chlorophenol, p-tert.-butyl phenol or 2,4,6-tribromophenol, but also long-chain alkyl phenols such as 4-(1,3-tetramethylbutyl)-phenol according to DE-OS 2 842 005 or monoalkyl phenol and/or dialkyl phenol with a total of 8 to 20 C atoms in the alkyl substituents according to German patent application P 3 506 472.2 such as 3,5-di-tert.-butyl phenol, p-iso-octyl phenol, p-tert.-octyl phenol, p-dodecyl phenol and 2-(3,5-dimethyl-heptyl)-phenol and 4-(3,5-dimethyl-heptyl)-phenol.

The quantity of chain terminators is generally between 0.5 and 10 mole %, related to the sum of the diphenols of formulae (II) and/or (III) used in each case.

The polycarbonates A suitable according to the invention have average molecular weights ($\overline{M}_w$), weight average, measured by ultracentrifuging or scattered light measurement for example) of 10,000 to 200,000, preferably 20,000 to 80,000.

The polycarbonates A suitable according to the invention may be branched in known manner, and indeed preferably by the incorporation of 0.05 to 2 mole %, related to the sum of the diphenols used, of tri- or more than trifunctional compounds, such as those with three or more than three phenolic groups.

In addition to the bisphenol A homopolycarbonate, preferred polycarbonates are the copolycarbonates of bisphenol A with up to 15 mole %, related to the mole sum of diphenols, of 2,2-bis-(3,5-dibromo-4-hydroxyphenyl)-propane and the copolycarbonates of bisphenol A with up to 60 mole %, related to the mole sum of diphenols, of 1,1-bis-(4-hydroxyphenyl)-3,3,5-trimethyl cyclohexane.

The polycarbonates A may be partially or completely replaced by aromatic polyester carbonates. The aromatic polycarbonates of Component A may also contain polysiloxane blocks. Their production is described in DE-OS 3 334 872 and U.S. Pat. No. 3,821,325 for example.

Component B

Vinyl (co)polymers according to Component B which can be used according to the invention are those consisting of at least one monomer from the series: styrene, α-methylstyrene and/or ring-substituted styrenes, $C_1$–$C_8$-alkyl methacrylate, $C_1$–$C_8$-alkyl acrylate (B.1) with at least one monomer from the series: acrylonitrile, methacrylonitrile, $C_1$–$C_8$-alkyl methacrylate, $C_1$–$C_8$-alkyl acrylate, maleic anhydride and/or N-substituted maleinimides (B.2).

$C_1$–$C_8$-alkyl acrylates and/or $C_1$–$C_8$-alkyl methacrylates are esters of acrylic acid and/or methacrylic acid and monohydric alcohols with 1 to 8 C atoms. Methacrylic acid methyl ester, ethyl ester and propyl ester are particularly preferred. Methylmethacrylate is quoted as particularly preferred methacrylic acid ester.

Thermoplastic (co)polymers with a composition according to Component B may be formed as a by-product of graft polymerization to produce Component C, particularly when large quantities of monomer are grafted onto small amounts of rubber. The amount of (co)polymer B to be used according to the invention does not include these by-products of the graft polymerization.

The (co)polymers according to Component B are resin-like, thermoplastic and rubber-free.

The thermoplastic (co)polymers B contain 50 to 98, preferably 60 to 95 parts by weight of B.1 and 50 to 2, preferably 40 to 5 parts by weight of B.2.

Particularly preferred (co)polymers B are those consisting of styrene with acrylonitrile and optionally with methyl methacrylate, of α-methylstyrene with acrylonitrile and optionally with methyl methacrylate, or of styrene and α-methylstyrene with acrylonitrile and optionally with methyl methacrylate.

The styrene/acrylonitrile copolymers according to Component B are known and may be produced by radical polymerization, particularly by emulsion, suspension, solution or bulk polymerization. The copolymers according to Component B preferably have molecular weights $\overline{M}_w$ (weight average, determined by light scattering or sedimentation) between 15,000 and 200,000.

Particularly preferred copolymers B according to the invention are also statistically synthesized copolymers consisting of styrene and maleic anhydride which may be produced from the corresponding monomers by a continuous bulk or solution polymerization with incomplete reactions.

The contents of the two components of the statistically synthesized styrene/maleic anhydride copolymers suitable according to the invention may be varied within wide limits. The preferred maleic anhydride content is 5 to 25 wt. %.

The molecular weights (number average ($\overline{M}_n$) of the statistically synthesized styrene/maleic anhydride copolymers according to Component B suitable according to the invention may vary over a wide range. The range of 60,000 to 200,000 is preferred. An intrinsic viscosity of 0.3 to 0.9 (measured in dimethyl formamide at 25° C.; see Hoffmann, Krömer, Kuhn, Polymeranalytik I, Stuttgart 1977, page 316 ff.) is preferred for these products.

Instead of styrene the vinyl (co)polymers B may also contain ring-substituted styrenes such as p-methylstyrene, vinyl toluene, 2,4-dimethylstyrene and other substituted styrenes such as α-methylstyrene.

Component C

Graft polymers C comprise, for example, graft copolymers with rubber-elastic properties, which are substantially obtainable from at least two of the following monomers: chloroprene, buta-1,3-diene, isopropene, styrene, acrylonitrile, ethylene, propylene, vinyl acetate and (meth) acrylic acid ester with 1 to 18 C atoms in the alcohol component; i.e. polymers as are described, for example, in "Methoden der Organischen Chemie" (Houben-Weyl), Vol. 14/1, Georg Thieme-Verlag, Stuttgart 1961, p. 393–406 and in C B Bucknall, "Toughened Plastics", Appl. Science Publishers, London 1977. Preferred polymers C are partially crosslinked and contain gel contents of over 20 wt. %, preferably over 40 wt. %, particularly over 60 wt. %.

Preferred graft polymers C comprise:

C.1 5 to 95, preferably 30 to 80 parts by weight of a mixture comprising

C.1.1 50 to 95 parts by weight of styrene, α-methylstyrene, halogen or methyl ring-substituted styrene, $C_1$–$C_8$-alkyl methacrylate, particularly methyl methacrylate, $C_1$–$C_8$-alkyl acrylate, particularly methyl methacrylate or mixtures of these compounds and C.1.2 5 to 50 parts by weight of acrylonitrile, methacrylonitrile, $C_1$–$C_8$-alkyl methacrylates, particularly methyl methacrylate, $C_1$–$C_8$-alkyl acrylate, particularly methacrylate, maleic anhydride, $C_1$–$C_4$-alkyl- and/or phenyl-N-substituted maleinimides or mixtures of these compounds on C.2 5 to 95, preferably 20 to 70 parts by weight of polymer with a glass transition temperature below –10° C.

Examples of preferred graft polymers C are polybutadienes, butadiene/styrene copolymers and acrylate rubbers grafted with styrene and/or acrylonitrile and/or alkyl (meth)acrylates; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with alkyl acrylates or methacrylates, vinyl acetate, acrylonitrile, styrene and/or alkyl styrenes, such as are described in DE-OS 2 348 377 (=U.S. Pat. No. 3,919,353).

Examples of particularly preferred polymers C are ABS polymers such as are described in DE-OS 2 035 390 (=U.S. Pat. No. 3,644,574) or in DE-OS 2 248 242 (=GB-PS 1 409 275) for example.

Particularly preferred graft polymers C are graft polymers which are obtainable by graft reaction of I. 10 to 70, preferably 15 to 50, particularly 20 to 40 wt. %, related to graft product, of at least one (meth)acrylic acid ester or 10 to 70, preferably 15 to 50, particularly 20 to 40 wt. % of a mixture consisting of 10 to 50, preferably 20 to 35 wt. %, related to mixture, of acrylonitrile or (meth)acrylic acid ester and 50 to 90, preferably 65 to 80 wt. %, related to mixture, of styrene, on II. 30 to 90, preferably 50 to 85, particularly 60 to 80 wt %, related to graft product, of a butadiene polymer with at least 50 wt. %, related to II, of butadiene groups as graft base, wherein preferably the gel content of the graft base II is at least 70 wt. % (measured in toluene), the degree of graft G 0.15 to 0.55 and the average particle diameter $d_{50}$ of the graft polymer 0.05 to 2 µm, preferably 0.1 to 0.6 µm.

(Meth)acrylic acid esters I are esters of acrylic acid or methacrylic acid and monohydric alcohols with 1 to 18 C atoms. Methylacrylic acid methyl, ethyl and propyl esters are particularly preferred.

In addition to butadiene groups the graft base II may contain up to 50 wt. %, related to II, of groups of other ethylenically unsaturated monomers such as styrene, acrylonitrile, esters of acrylic or methacrylic acid with 1 to 4 C atoms in the alcohol component (such as methyl acrylate, ethyl acrylate, methyl methacrylate, ethyl methacrylate), vinyl esters and/or vinyl ethers. The preferred graft base II consists of pure polybutadiene.

The degree of graft G denotes the weight ratio between grafted graft monomers and the graft base and is dimensionless.

The average particle size $d_{50}$ is the diameter above and below which 50 wt. % of the particles lie in each case. It may be determined by ultracentifuge measurement (W. Scholtan, H. Lange, Kolloid, Z. und Z. Polymere 250 (1972), 782–796).

Examples of particularly preferred polymers C are also graft polymers consisting of
(a) 20 to 90 wt. %, related to C, of acrylate rubber with a glass transition temperature below −20° C. as graft base and
(b) 10 to 80 wt. %, related to C, of at least one polymerizable ethylenically unsaturated monomer (cf. C.1) as graft monomer.

The acrylate rubbers (a) of polymers C are preferably polymers of acrylic acid alkyl esters, optionally with up to 40 wt. %, related to (a), of other polymerizable ethylenically unsaturated monomer. $C_1$–$C_8$-alkyl esters, such as methyl, ethyl, butyl, n-octyl and 2-ethyl hexylester; halogen alkyl esters, preferably halogen-$C_1$–$C_8$-alkyl esters, such as chloroethyl acrylate, and mixtures of these monomers, belong to the preferred polymerizable acrylic acid esters.

For crosslinking, monomers with more than one polymerizable double bond may be copolymerized. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as ethylene glycol dimethacrylate, allyl methacrylate; polyunsaturated heterocyclic compounds such as trivinyl and triallyl cyanurate; polyfunctional vinyl compounds such as di- and tri-vinyl benzenes; but also triallyl phosphate and diallyl phthalate.

Preferred crosslinking monomers are allyl methacrylate, ethylene glycol dimethyl-acrylate, diallyl phthalate and heterocyclic compounds which have at least three ethylenically unsaturated groups.

Particularly preferred crosslinking monomers are the cyclic monomers triallyl cyanurate, triallyl isocyanurate, trivinyl cyanurate, triacryloylhexahydro-s-triazine, triallyl benzenes.

The quantity of crosslinking monomers is preferably 0.02 to 5, particularly 0.05 to 2 wt. %, related to the graft base (a).

In the case of cyclic crosslinking monomers with at least three ethylenically unsaturated groups it is advantageous to limit the quantity to below 1 wt. % of the graft base (a).

Examples of preferred "other" polymerizable, ethylenically unsaturated monomers which may also optionally serve to produce the graft base (a) in addition to the acrylic acid esters, are acrylonitrile, styrene, α-methylstyrene, acrylamides, vinyl-$C_1$–$C_6$-alkylethers, methyl methacrylate, butadiene. Preferred acrylate rubbers as graft base (a) are emulsion polymers which have a gel content of at least 60 wt. %.

Further suitable graft bases are silicone rubbers with graft-active sites, such as are described in published patent applications DE-OS 3 704 657, DE-OS 3 704 655, DE-OS 3 631 540 and DE-OS 3 631 539.

The gel content of the graft base (a) is determined at 25° C. in dimethyl formamide (M. Hoffmann, H. Krömer, R. Kuhn, Polymeranalytik I and II, George Thieme-Verlag publishers, Stuttgart 1977).

Since in the graft reaction, the graft monomers are not necessarily completely grafted onto the graft base, as is known, according to the invention graft polymers C are also understood to mean those products which are obtained by polymerization of the graft monomers in presence of the graft base.

Component D

As flame-proofing agents the moulding compositions according to the invention contain phosphorus compounds according to formula (I),

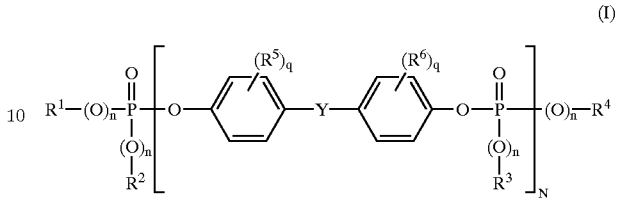

in which the groups have the meanings quoted above.

The phosphorus compounds according to Component D suitable according to the invention are generally known (see for example Ullmanns Encyklopäidie der Technischen Chemie, Vol. 18, p. 301 ff., 1979; Houben-Weyl, Methoden der Organischen Chemie, Vol. 12/1, p. 43; Beulstein, Vol. 6, p. 177). Preferred substituents $R^1$ to $R^4$ comprise methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. Methyl, ethyl, butyl, phenyl and naphthyl are particularly preferred.

The aromatic groups $R^1$, $R^2$, $R^3$ and $R^4$ may be substituted with halogen and/or $C_1$–$C_4$-alkyl. Particularly preferred aryl groups are cresyl, phenyl, xylenyl, propylphenyl or butylphenyl and also the brominated and chlorinated derivatives thereof.

Independently of each other $R^5$ and $R^6$ preferably mean methyl or bromine.

Y preferably stands for $C_1$–$C_7$-alkylene, particularly for isopropylidene or methylene.

In formula (I), n may be 0 or 1, independently of each other, preferably n is equal to 1.

q may be 0, 1, 2, 3 or 4, preferably q is 0,1 or 2.

N may assume values of 0.1 to 5, preferably 0.3 to 2. Mixtures of different phosphates may also be used as Component D according to the invention. In this case N has an average value of 0.1 to 5, preferably 0.3 to 2. As phosphorus compounds this mixture may also contain monophosphorus compounds (N=0).

Monophosphorus compounds according to formula (I) where N=0 are preferably tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, methyl phosphoric acid dimethyl esters, methyl phosphonic acid diphenyl esters, phenyl phosphonic acid diethyl esters and triphenyl phosphine oxide.

Component E

The fluorinated polyolefins E are high-molecular and have glass transition temperatures of above −30° C., generally above 100° C. Their fluorine contents are preferably 65 to 76, particularly 70 to 76 wt. %. Their average particle diameters $d_{50}$ are generally 0.05 to 1,000, preferably 0.08 to 20 μm. Generally speaking the fluorinated polyolefins E have a density of 1.2 to 2.3 g/cm³.

Preferred fluorinated polyolefins E are polytetrafluoroethylene, polyvinylidene fluoride, tetrafluoroethylene/hexafluoropropylene and ethylene/tetrafluoroethylene copolymers.

The fluorinated polyolefins are known (cf. "Vinyl and Related Polymers" by Schildknecht, John Wiley & Sons, Inc., New York, 1962, page 484 to 494; "Fluorpolymers" by Wall, Wiley Interscience, John Wiley & Sons, Inc., New York, Vol. 13, 1970, page 623 to 654; "Modern Plastics Encyclopedia", 1970 to 1971, Vol. 47, No. 10A, October 1970, McGraw-Hill, Inc., New York, page 134 and 774; "Modern Plastics Encyclopedia", 1975 to 1976, October 1975, Vol. 52, No. 10A, McGraw-Hill, Inc., New York, page 27, 28 and 472 and U.S. Pat. Nos. 3,671,487, 3,723,373 and 3,838,092).

They may be produced by known processes, such as by polymerization of tetrafluoroethylene in aqueous medium with a catalyst forming free radicals, such as sodium, potassium or ammonium peroxydisulphate at pressures of 7 to 71 kg/cm$^2$ and at temperatures of 0 to 200° C., preferably at temperatures of 20 to 100° C. (For further details see U.S. Pat. No. 2,393,967 for example). Depending on the form of use, the density of these materials may be between 1.2 and 2.3 g/cm$^3$, the average particle size between 0.05 and 1,000 µm.

Preferred fluorinated polyolefins E are tetrafluoroethylene polymers. They have average particle diameters of 0.05 to 20 µm, preferably 0.08 to 10 µm, and a density of 1.2 to 1.9 g/cm$^3$ and are preferably used in the form of a coagulated mixture of emulsions of the tetrafluoroethylene polymers E with emulsions of the graft polymers. C.

Suitable fluorinated polyolefins E which can be used in powder form are tetrafluoroethylene polymers with average particle diameters of 100 to 1,000 µm and densities of 2.0 g/cm$^3$ to 2.3 g/cm$^3$.

To produce a coagulated mixture of C and E, initially an aqueous emulsion (latex) of a graft polymer C with average latex particle diameters of 0.05 to 2 µm, particularly 0.1 to 0.6 µm, is mixed with a finely divided emulsion of a tetrafluoroethylene polymer E in water with average particle diameters of 0.05 to 20 µm, particularly 0.08 to 10 µm; suitable tetrafluoroethylene polymer emulsions conventionally have solids contents of 30 to 70 wt. %, particularly 50 to 60 wt. %. The emulsions of the graft polymers C have solids contents of 25 to 50 wt. %, preferably 30 to 45 wt. %.

The quantity quoted in the description of Component C does not include the content of the graft polymer in the coagulated mixture of graft polymer and fluorinated polyolefins.

In the emulsion mixture the weight ratio of graft polymer C to tetrafluoroethylene polymer E is 95:5 to 60:40. The emulsion mixture is coagulated in known manner, such as by spray-drying, freeze-drying or coagulation by adding inorganic or organic salts, acids, bases or organic solvents miscible with water, such as alcohols, ketones, preferably at temperatures of 20 to 150° C., particularly 50 to 100° C. If required, drying may take place at 50 to 200° C., preferably 70 to 100° C.

Suitable tetrafluoroethylene polymer emulsions are conventional commercial products and are offered as Teflon® 30 N by DuPont, for example.

Component F

Finely divided inorganic compounds according to Component F consist of compounds of one or more metals of main groups 1 to 5 and sub-groups 1 to 8 of the periodic system, preferably main groups 2 to 5 and sub-groups 4 to 8, particularly preferably main groups 3 to 5 and sub-groups 4 to 8 with at least one element selected from the group consisting of oxygen, sulfur, boron, phosphorus, carbon, nitrogen, hydrogen and silicon.

Examples of preferred compounds are oxides, hydroxides, hydrous oxides, sulfates, sulfites, sulfides, carbonates, carbides, nitrates, nitrites, nitrides, borates, silicates, phosphates, hydrides, phosphites or phosphonates.

Examples of preferred finely divided inorganic compounds are TIN, $TiO_2$, $SnO_2$, WC, ZnO, $Al_2O_3$, AlO(OH), $ZrO_2$, $Sb_2O_3$, $SiO_2$, iron oxides, $Na_2SO_4$, $BASO_4$, vanadium oxides, zinc borate, silicates such as Al silicates, Mg silicates, one, two, three dimensional silicates, mixtures and doped compounds may also be used. Furthermore these nano-scale particles may be surface-modified with organic molecules, to obtain better compatibility with the polymers. Hydrophobic or hydrophilic surfaces may be produced in this way.

The average particle diameters are not great,r than 200 nm, preferably not greater than 150 nm, particularly 1 to 100 nm.

Throughout, particle size and particle diameter mean the average particle diameter $d_{50}$, determined by ultracentrifuge measurements according to W. Scholtan et al., Kolloid-Z. und Z. Polymere 250 (1972), p. 782 to 796.

The inorganic compounds may be present as powders, pastes, sols, dispersions or suspensions. Powders may be obtained from dispersions, sols or suspensions by precipitation.

The powders may be incorporated into the thermoplastic plastics by conventional methods, such as by direct mixing or extrusion of the constituents of the moulding compositions and the finely divided inorganic powders. Preferred methods are the production of a masterbatch, e.g. in flame-proofing additives, other additives, monomers, solvents, in Component A or the co-precipitation of dispersions of Components B or C with dispersions, suspensions, pastes or sols of the finely divided inorganic materials.

The moulding compositions according to the invention may contain conventional additives, such as lubricants and mould release agents, nucleating agents, anti-static agents, stabilizers, fillers and reinforcing materials as well as dyes and pigments.

The filled and/or reinforced moulding compositions may contain up to 60, preferably 10 to 40 wt. %, related to the filled and/or reinforced moulding composition, of fillers and/or reinforcing materials. Preferred reinforcing materials are glass fibres. Preferred fillers, which may also have a reinforcing effect, are glass marbles, mica, silicates, quartz, talc, titanium dioxide, wollastonite.

The moulding compositions according to the invention consisting of Components A to F and optionally further known additives such as stabilizers, dyes, pigments, lubricants and mould release agents, fillers and reinforcing materials, nucleating agents and anti-static agents, are produced by mixing the particular constituents in known manner and melt-compounding or melt-extruding them at temperatures of 200° C. to 300° C. in conventional equipment such as internal mixers, extruders and twin screw extruders, wherein Component E is preferably used in the form of the above-mentioned coagulated mixture.

The moulding compositions according to the invention may optionally contain flame-proofing agents different from compounds of formula (I) in a quantity up to 20 parts by weight. Synergistically acting flame-proofing materials are preferred. Examples of further flame-proofing agents are organic halogen compounds such as decabromobisphenylether, tetrabromobisphenol, inorganic halogen compounds such as ammonium bromide, nitrogen compounds such as melamine, melamine/formaldehyde resins or siloxane compounds. The moulding compositions according to the invention may optionally contain inorganic substances different from the inorganic compounds F, for example, inorganic hydroxide compounds such as Mg, Al-hydroxide, inorganic compounds such as aluminium oxide, antimony oxides, barium metaborate, hydroxoantimonate, zirconium oxide, zirconium hydroxide, molybdenum oxide, ammonium molybdate, zinc borate, ammonium borate, barium metaborate and tin oxide.

The invention therefore also provides a process for producing thermoplastic moulding compositions consisting of Components A to F as well as optionally stabilizers, dyes, pigments, lubricants and mould release agents, fillers and reinforcing materials, nucleating agents and anti-static agents, which is characterized in that after mixing, the components and additives are melt-compounded or melt-extruded in conventional equipment at temperatures of 200 to 300° C., wherein Component E is preferably used in the form of a coagulated mixture with Component C.

The individual constituents may be mixed in known manner both successively and simultaneously, and at both approx. 20° C. (room temperature) and at higher temperature.

The moulding compositions of the present invention may be used to produce moulded bodies of all kinds. In particular moulded bodies may be produced by injection moulding. Examples of moulded bodies which can be produced are: housing components of all kinds, such as for domestic appliances such as juicers, coffee machines, mixers, for office machines such as computers, printers, monitors or cover panels for the building sector and components for the motor vehicle sector. They are also used in the field of electrical engineering because they have very good electrical properties.

The moulding compositions are particularly suitable for producing thin-walled moulded parts (e.g. data processing housing parts) where the plastics used are required to meet particularly high demands as regards notch impact strength and resistance to stress cracking.

A further form of processing is the production of moulded bodies by blow-moulding or by thermoforming from previously produced sheets or films.

EXAMPLES

Component A

Polycarbonate based on bisphenol A with a relative solution viscosity of 1.26 to 1.28, measured in methylene chloride at 25° C. and in a concentration of 0.5 g/100 ml.

Component B

Styrene/acrylonitrile copolymer with a styrene/acrylonitrile ratio of 72:28 and an intrinsic viscosity of 0.55 dl/g (measurement in dimethyl formamide at 20° C.).

Component C

Graft polymer consisting of 45 parts by weight of styrene and acrylonitrile in the ratio 72:28 on 55 parts by weight of particulate crosslinked polybutadiene rubber (average particle diameter $d_{50}$, 0.4 μm), produced by emulsion polymerization.

Component D

D.1:

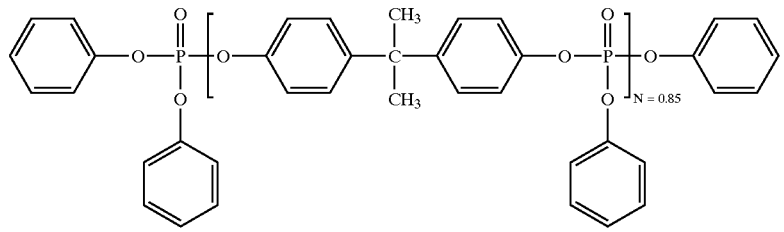

D.2: Triphenyl phosphate (Disflamoll® (TPP), Bayer AG, Leverkusen, Germany

D.3: Fyrolflex RDP, Akzo, based on m-phenylene-bis(diphenyl-phosphate).

Component E

Tetrafluoroethylene polymer as coagulated mixture of an SAN graft polymer emulsion according to Component C in water and a tetrafluoroethylene polymer emulsion in water. The weight ratio of graft polymer C to tetrafluoroethylene polymer E in the mixture is 90 wt. % to 10 wt. %. The tetrafluoroethylene polymer emulsion has a solids content of 60 wt. %, the average particle diameter is between 0.05 and 0.5 μm. The SAN graft polymer emulsion has a solids content of 34 wt. % and an average latex particle diameter of 0.4 μm.

Production of E

The emulsion of the tetrafluoroethylene polymer (Teflon 30 N, DuPont) is mixed with the emulsion of the SAN graft polymer C and stabilized with 1.8 wt. %, related to polymer solids, of phenolic anti-oxidants. At 85 to 95° C. the mixture is coagulated with an aqueous solution of $MgSO_4$ (Epsom salts) and acetic acid at pH 4 to 5, filtered and washed until virtually electrolyte-free; the majority of the water is then removed by centrifuging and the mixture is then dried to a powder at 100° C. This powder may then be compounded with the further components in the equipment described.

Component F

Pural 200, an aluminium oxide-hydroxide (Condea, Hamburg, Germany) is used as finely divided inorganic compound. The average particle size of the material is approx. 50 nm.

Producing and Testing the Moulding Compositions According to the Invention

Components A to F are mixed on a 3 liter internal mixer. The moulded bodies are produced on an Arburg 270E type injection moulding machine at 260° C.

Stress cracking behaviour is tested on rods of dimensions 80×10×4 mm, mass temperature 260° C. A mixture consisting of 60 vol. % of toluene and 40 vol. % of isopropanol is used as test medium. The test bodies are pre-strained by means of a circular arc template (pre-strain 1.2 to 2.4%) and stored in the test medium at room temperature. Stress cracking behaviour is evaluated by means of crack formation as a function of the pre-strain and/or fracture, according to the exposure time in the test medium.

The flame test is carried out according to UL 94/IEC 707FV.

Notch impact strength $a_k$ is determined by ISO method 180 1A using rods of dimension 80×10×4 mm at room temperature.

Vicat B heat deflection temperature is determined to DIN 53 460.

The composition of the materials tested and the data obtained are summarized in Table 1 below.

TABLE

| Examples | 1 Compar. | 2 Compar. | 3 Compar. | 4 | 5 |
|---|---|---|---|---|---|
| Components: [parts by weight] | | | | | |
| A | 67.0 | 67.0 | 67.0 | 67.0 | 67.0 |
| B | 9.5 | 9.5 | 9.5 | 9.5 | 9.5 |
| C | 8.0 | 8.0 | 8.0 | 8.0 | 8.0 |
| D.1 | 12.0 | — | — | 12.0 | 14.0 |
| D.2 | — | 12.0 | — | — | — |
| D.3 | — | — | 12.0 | — | — |
| E | 3.5 | 3.5 | 3.5 | 3.5 | 3.5 |
| F | — | — | — | 1.0 | 1.0 |
| Properties: | | | | | |
| Vicat B 120 [° C.] | 103 | 88 | 94 | 103 | 108 |
| $a_k$ [kJ/m²] | 43 | 37 | 33 | 44 | 48 |
| ESC behaviour | | | | | |
| 2.4% | BR5:00 | | | BR5:50 | BR7:00 |
| 1.8% | | | BR4:30 | | |
| 1.6% | | BR4:00 | | | |
| UL 94V 1.6 mm | V-2 | V-0 | V-0 | V-0 | V-0 |

The Table shows that although comparison example 1, which contains Component D.1 as flame-proofing agent, has better mechanical properties than comparison examples 2 and 3 which contain Components D.2 and D.3 as flame-proofing agent, it has disadvantages as regards flame-proofing behaviour (V2). This disadvantage is equalized only by addition of the finely divided inorganic material (Examples 4 and 5). The mechanical properties such as notch impact strength and stress cracking behaviour of Examples 4 and 5 according to the invention are also distinctly improved. The examples according to the invention demonstrate the desired favourable property combination of flame-proofness, mechanical properties and high heat deflection temperature.

What is claimed is:

1. A flame-proof thermoplastic molding composition containing:
   A. 40 to 98 parts by weight of an aromatic polycarbonate;
   B. 0 to 50 parts by weight of a vinyl copolymer;
   C. 0.5 to 60 parts by weight of a graft polymer produced by copolymerization of,
      (a) 5 to 95 parts by weight of a mixture comprising,
         (i) 50 to 95 parts by weight of a member selected from the group consisting of styrene, α-methylstyrene, halogen or alkyl ring-substituted styrene, $C_1$–$C_8$-alkyl methacrylate, $C_1$–$C_8$-alkyl acrylate, and mixtures thereof, and
         (ii) 5 to 50 parts by weight of a member selected from the group consisting of acrylonitrile, methacrylonitrile, $C_1$–$C_8$-alkyl methacrylate, $C_1$–$C_8$-alkyl acrylate, maleic anhydride, $C_1$–$C_4$-alkyl- and/or phenyl-N-substituted maleinimide and mixtures thereof, and
      (b) 5 to 95 parts by weight of a rubber graft base with a glass transition temperature below −10° C.;
   D. 0.5 to 20 parts by weight of a phosphorus compound of formula

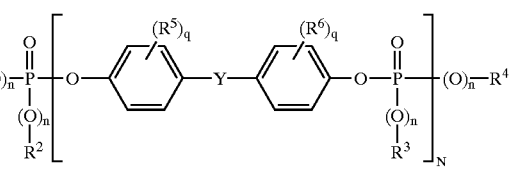

(I)

in which
   $R^1$, $R^2$, $R^3$ and $R^4$ independently of each other mean $C_1$–$C_8$ alkyl optionally substituted by halogen, $C_5$–$C_6$-cycloalkyl, $C_6$–$C_{10}$-aryl or $C_7$–$C_{12}$-aralkyl optionally substituted by halogen and/or alkyl in each case,
   n independently of each other means 0 or 1,
   q independently of each other means 0, 1, 2, 3 or 4,
   N means 0.1 to 5,
   $R^5$ and $R^6$ independently of each other mean $C_1$–$C_4$-alkyl or halogen, and
   Y means $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, —$SO_2$— or —CO—;
   E. 0.05 to 5 parts by weight of fluorinated polyolefin; and
   F. 0.1 to 50 parts by weight of a finely divided inorganic compound which is AlO(OH), said finely divided inorganic compound having an average particle diameter <200 nm.

2. The molding composition of claim 1 wherein the average particle diameter of Component F is not greater than 150 nm.

3. The molding composition of claim 1 wherein said composition contains 50 to 95 parts by weight of said aromatic polycarbonate A.

4. The molding composition of claim 1 wherein in formula (I) N has a value of 0.3 to 2.

5. The molding composition of claim 1 wherein in formula (I) Y represents a methylene or isopropylidene group.

6. The molding composition of claim 1 wherein said composition contains 0.01 to 20 wt. %, related to the total molding composition, of at least one further flame-proofing agent that is different from Component D.

7. The molding composition of claim 6, wherein the flame proofing agent different from D is at least one monophosphorous compound selected from the group consisting of tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, methyl phosphonic acid dimethyl esters, methyl phosphonic acid diphenyl esters, phenyl phosphonic acid diethyl esters, triphenyl phosphine oxide and tricresyl phosphine oxide.

8. The molding composition of claim 1 wherein said rubber graft base is a member selected from the group consisting of diene rubber, acrylate rubber, silicone rubber and ethylene/propylene/diene rubber.

9. The molding composition of claim 1 further containing at least one member selected from the group consisting of stabilizers, pigments, mold release agent, flow auxiliary substances and anti-static agents.

10. A molded article comprising the composition of claim 1.

11. The molding composition of claim 1 wherein $R^5$ and $R^6$ are each independently of each other methyl, chlorine or bromine.

12. The molding composition of claim 1 wherein said finely divided inorganic compound has an average particle diameter of about 50 nm.

13. The molding composition of claim 1 wherein said finely divided inorganic compound has an average particle diameter of 1 to 100 nm.

14. The molding composition of claim 1 wherein said rubber graft base C.(b) is selected from at least one member of the group consisting of polybutadienes, butadiene/styrene copolymers, and acrylate rubbers grafted with at least one of styrene, acrylonitrile and alkyl (meth)acrylates.

15. A flame-proof thermoplastic molding composition containing:

A. 40 to 98 parts by weight of an aromatic polycarbonate;

B. 0 to 50 parts by weight of a vinyl copolymer;

C. 0.5 to 60 parts by weight of a graft polymer produced by copolymerization of,
  (a) 5 to 95 parts by weight of a mixture comprising,
    (i) 50 to 95 parts by weight of a member selected from the group consisting of styrene, α-methylstyrene, halogen or alkyl ring-substituted styrene, $C_1$–$C_8$-alkyl methacrylate, $C_1$–$C_8$-alkyl acrylate, and mixtures thereof, and
    (ii) 5 to 50 parts by weight of a member selected from the group consisting of acrylonitrile, methacrylonitrile, $C_1$–$C_8$-alkyl methacrylate, $C_1$–$C_8$-alkyl acrylate, maleic anhydride, $C_1$–$C_4$-alkyl- and/or phenyl-N-substituted maleinimide and mixtures thereof, and
  (b) 5 to 95 parts by weight of a rubber graft base with a glass transition temperature below −10° C.;

D. 0.5 to 20 parts by weight of a phosphorus compound of formula (I)

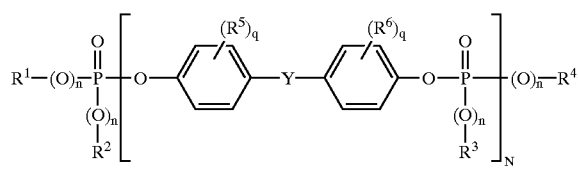

in which
$R^1$, $R^2$, $R^3$ and $R^4$ independently of each other mean $C_1$–$C_8$ alkyl optionally substituted by halogen, $C_5$–$C_6$-cycloalkyl, $C_6$–$C_{10}$-aryl or $C_7$–$C_{12}$-aralkyl optionally substituted by halogen and/or alkyl in each case,
n independently of each other means 0 or 1,
q independently of each other means 0, 1, 2, 3 or 4,
N means 0.1 to 5,
$R^5$ and $R^6$ independently of each other mean $C_1$–$C_4$-alkyl or halogen, and
Y means $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, —$SO_2$— or —CO—;

E. 0.05 to 5 parts by weight of fluorinated polyolefin; and

F. 0.1 to 50 parts by weight of a finely divided inorganic compound which is a mixture of $Al_2O_3$ and AlO(OH), said finely divided inorganic compound having an average particle diameter <200 nm.

* * * * *